United States Patent
Huang

(10) Patent No.: US 8,075,073 B2
(45) Date of Patent: Dec. 13, 2011

(54) NOTEBOOK COMPUTER COOLING PAD WITH RECEIVING BOX

(76) Inventor: Cheng Yu Huang, Taipei (TW)

(*) Notice: Subject to any disclaimer, the term of this patent is extended or adjusted under 35 U.S.C. 154(b) by 421 days.

(21) Appl. No.: 12/394,663

(22) Filed: Feb. 27, 2009

(65) Prior Publication Data
US 2010/0219729 A1    Sep. 2, 2010

(51) Int. Cl.
*A47B 88/00* (2006.01)
(52) U.S. Cl. .................. 312/330.1; 312/223.1
(58) Field of Classification Search .............. 108/25–26; 361/679.46–679.54, 688–723; 248/309.1, 248/310, 311.2; 312/330.1, 223.1–223.3, 312/236
See application file for complete search history.

(56) References Cited

U.S. PATENT DOCUMENTS

| | | | | |
|---|---|---|---|---|
| 5,692,815 A * | 12/1997 | Murphy | .................. | 312/283 |
| 5,992,155 A * | 11/1999 | Kobayashi et al. | .............. | 62/3.7 |
| 6,707,668 B2 * | 3/2004 | Huang | ................... | 361/679.48 |
| 6,928,932 B1 * | 8/2005 | Ferrill | ................... | 108/23 |
| 7,301,765 B2 * | 11/2007 | Huang | ................... | 361/695 |
| 7,980,526 B2 * | 7/2011 | Lord et al. | ................... | 248/444 |
| 2004/0169044 A1 * | 9/2004 | Chen et al. | ................... | 220/836 |
| 2007/0289097 A1 * | 12/2007 | Barnett | ................... | 16/342 |
| 2008/0184530 A1 * | 8/2008 | Chao | ................... | 16/342 |
| 2010/0046169 A1 * | 2/2010 | Hu | ................... | 361/707 |

* cited by examiner

*Primary Examiner* — Hanh V Tran
(74) *Attorney, Agent, or Firm* — Jackson IPG PLLC; Demian K. Jackson

(57) ABSTRACT

A notebook computer cooling pad with a receiving box is provided. The cooling pad has a base plate whose front edge is provided with a curved plate, and the curved plate is coupled with a support plate so as to form a tubular space. A drawer provided at one or each of two ends of the tubular space can be pulled out of or pushed into the tubular space and serves to receive a power cable, a USB flash drive, or a stationery article.

6 Claims, 8 Drawing Sheets

NOTEBOOK COMPUTER COOLING PAD WITH RECEIVING BOX

BACKGROUND OF THE INVENTION

1. Technical Field

The present invention relates to notebook computer cooling pads and, more particularly, to a notebook computer cooling pad with a receiving box, wherein the cooling pad has a base plate whose front edge is formed with a tubular space provided therein with a drawer for receiving a power cable, a USB flash drive, or a stationery article.

2. Description of Related Art

Notebook computers are lightweight, compact, and therefore suitable for being carried and used wherever desired. Thus, notebook computers are also known as "mobile computers". However, limited by their size and structure, notebook computers have far poorer heat dissipation efficiency than desktop PCs. To solve this problem, manufacturers developed cooling pads on which notebook computers are placed to enhance heat dissipation.

Generally, when a notebook computer cooling pad is in use, it is necessary to also use a power cable for coupling a notebook computer with the cooling pad, a USB flash drive for storing data, or some basic stationery accessories such as paper clips. However, it is very inconvenient if the aforesaid computer peripherals or stationery accessories are to be carried and stored individually.

A conventional notebook computer cooling pad is typically short of a mechanism for receiving a power cable and other accessories. Even if a receiving box is provided, it is located at the back of the cooling pad and therefore not convenient to use.

BRIEF SUMMARY OF THE INVENTION

The present invention is intended to overcome the shortcomings of the conventional notebook computer cooling pad, particularly in terms of storage for a power cable or other accessories. The best approach to this end is to utilize the basic structure of existing cooling pads in an ingenious manner so as to provide a notebook computer cooling pad capable of a reasonable and convenient mode of use.

According to the present invention, a notebook computer cooling pad has a base plate whose front edge is provided with a curved plate, which in turn is coupled with a support plate to form a tubular space. A drawer for receiving a power cable, a USB flash drive, or a stationery article is provided at one or each of two ends of the tubular space and can be pulled out of and pushed into the tubular space.

BRIEF DESCRIPTION OF THE SEVERAL VIEWS OF THE DRAWINGS

The invention as well as a preferred mode of use, further objectives, and advantages thereof will be best understood by referring to the following detailed description of illustrative embodiments in conjunction with the accompanying drawings, wherein.

DETAILED DESCRIPTION OF THE INVENTION

Figure 1:
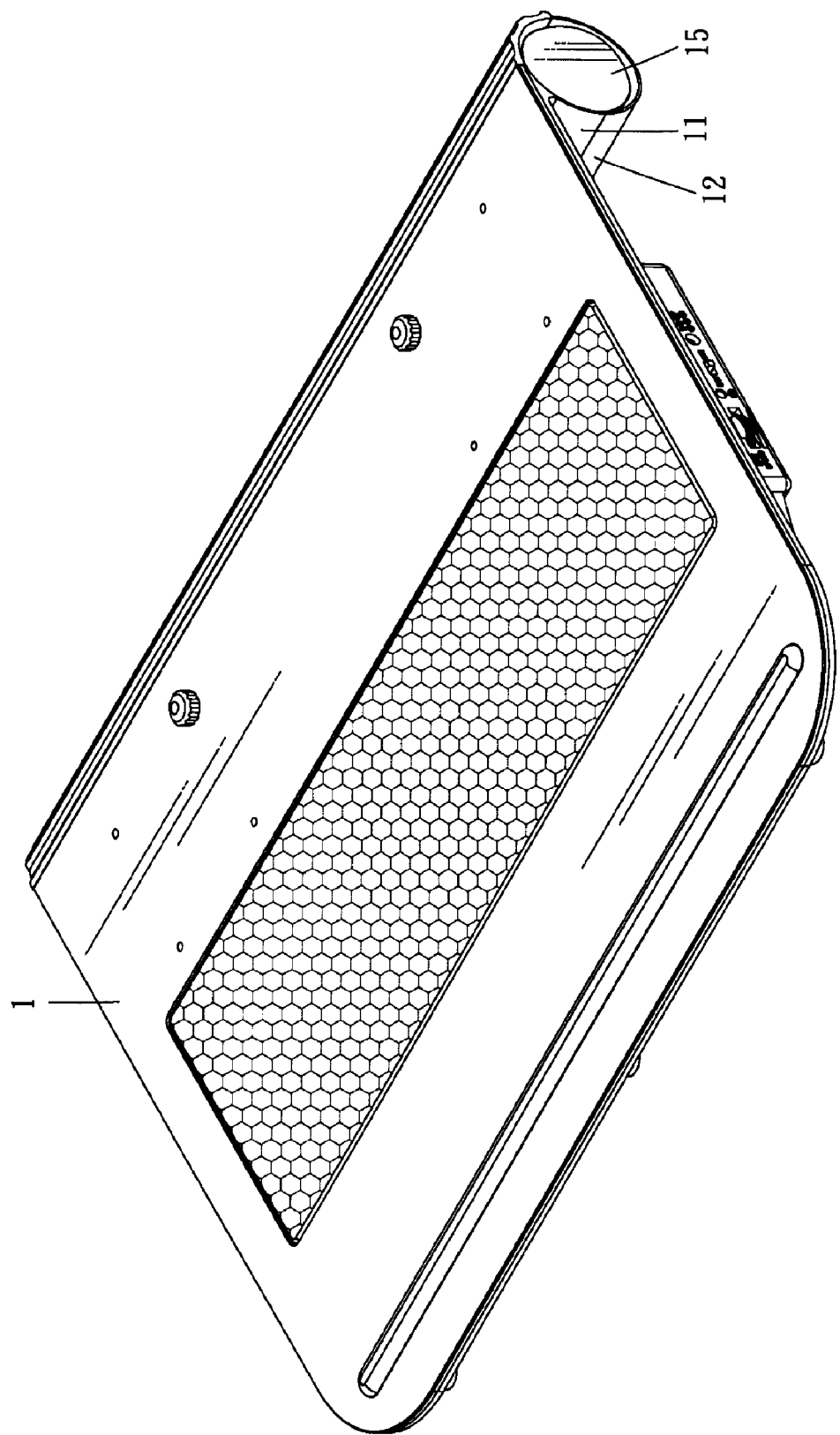
FIG. 1 is a perspective view of a first embodiment of the present invention.
Figure 2:
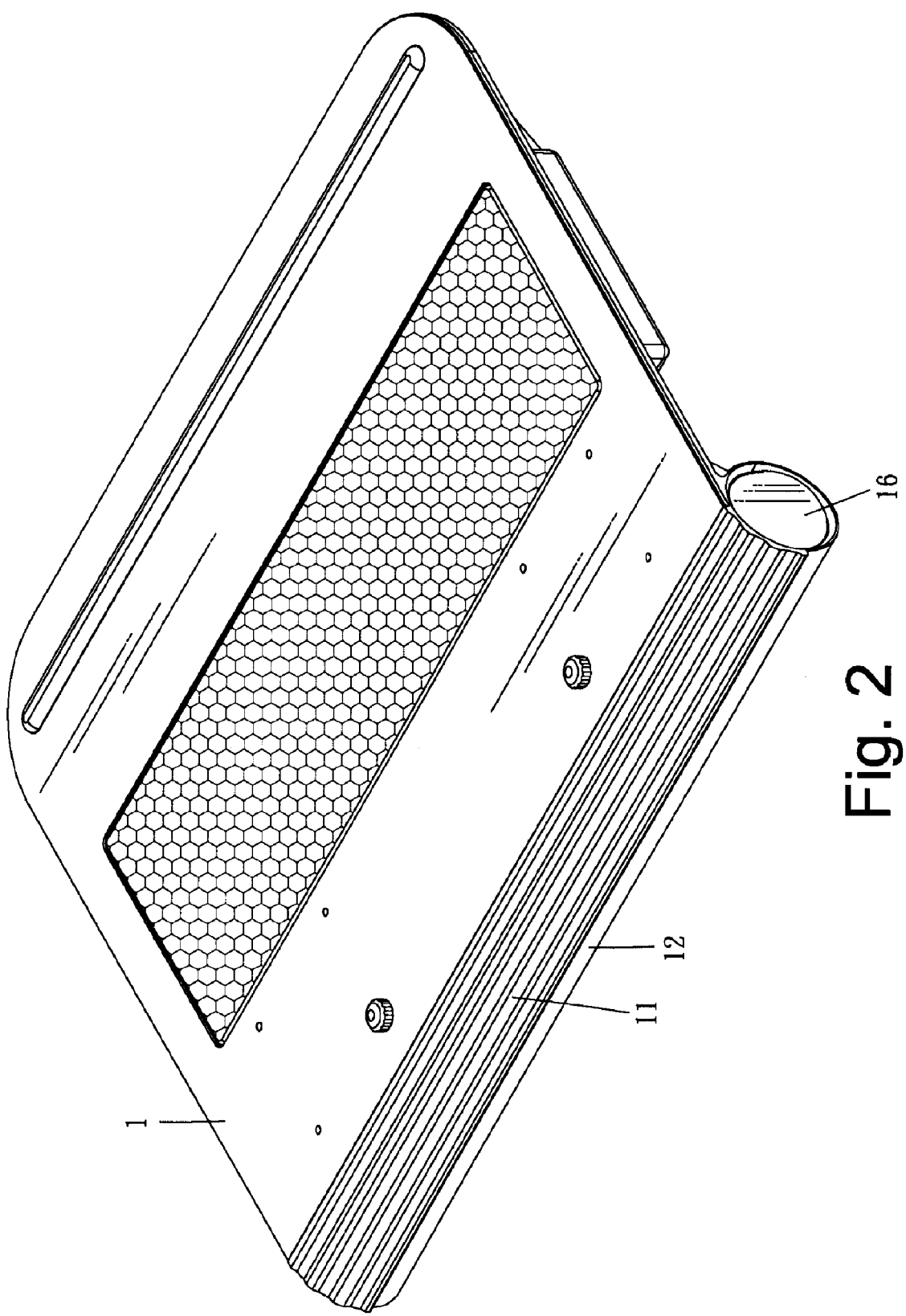
FIG. 2 is a perspective view of the first embodiment of the present invention observed from another viewing angle.
Figure 3:
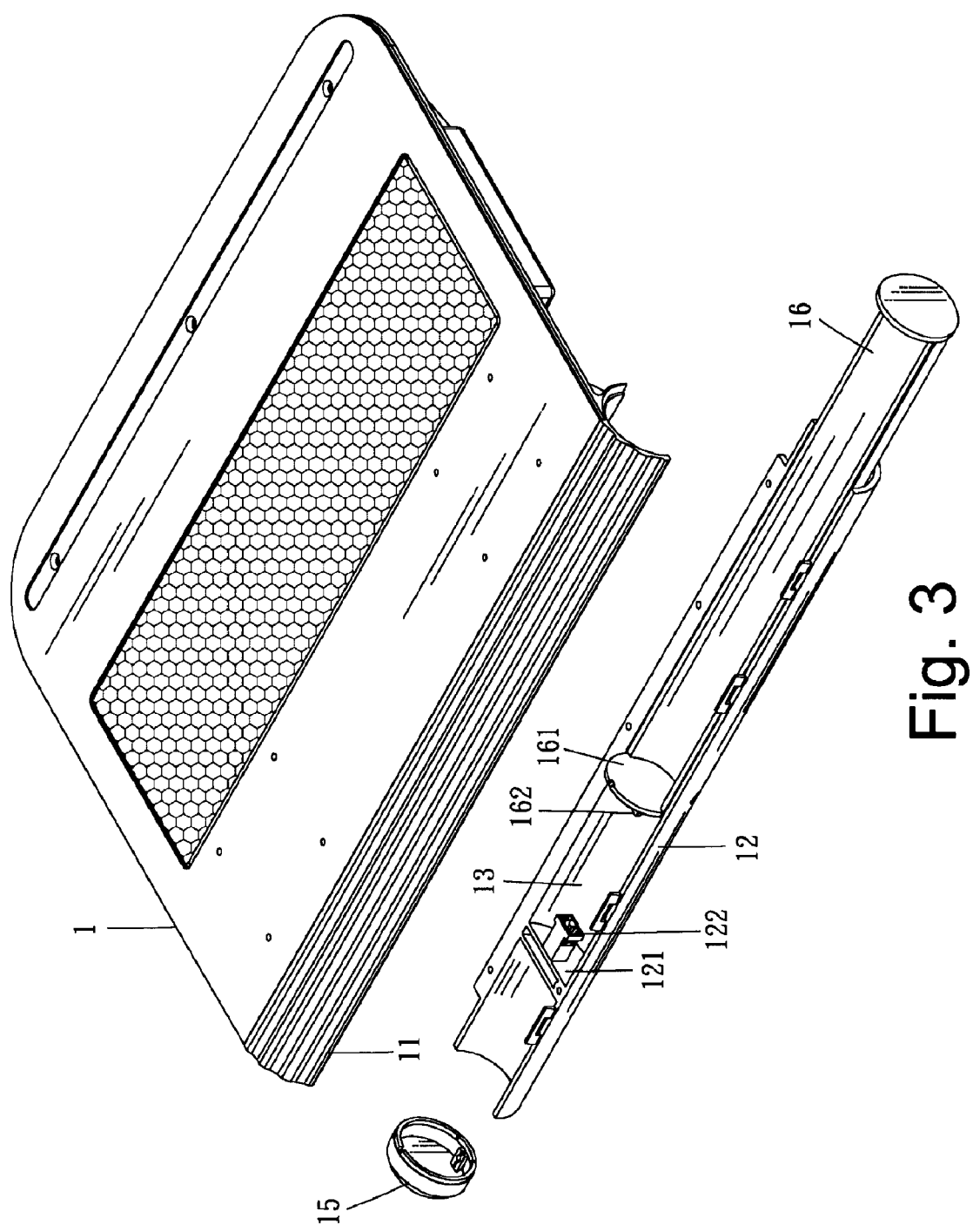
FIG. 3 is a partially exploded perspective view of the first embodiment of the present invention.
Figure 4:
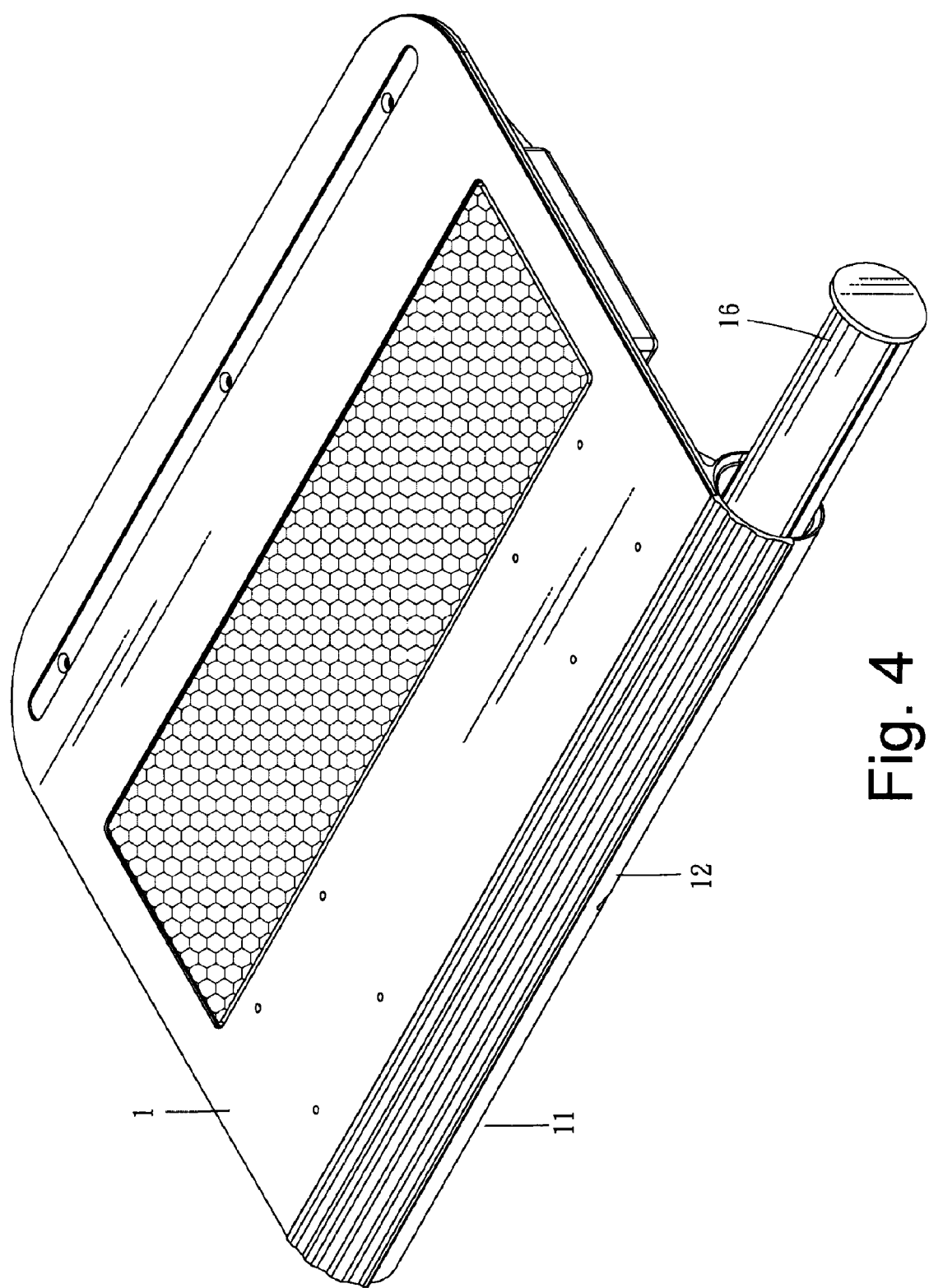
FIG. 4 is a perspective view of the first embodiment of the present invention, wherein a drawer is pulled out partway.

Referring to FIGS. 1 through 4, a notebook computer cooling pad with a receiving box according to the present invention is characterized in that the cooling pad has a base plate 1 whose front edge is provided with a curved plate 11, and the curved plate 11 has a bottom fixedly coupled with a support plate 12 so that the curved plate 11 and the support plate 12 form a tubular space 13. In addition, a vertical plate 121 is provided at an appropriate position on the support plate 12.

A drawer 16 is settled in the tubular space 13 so as to form a receiving box that can be pulled out of and pushed into the tubular space 13 and serves to receive a USB flash drive, paper clips, a pen, or other stationery articles. Besides, the tubular space 13 has an opposite end fitted with a cover 15.

Figure 5:
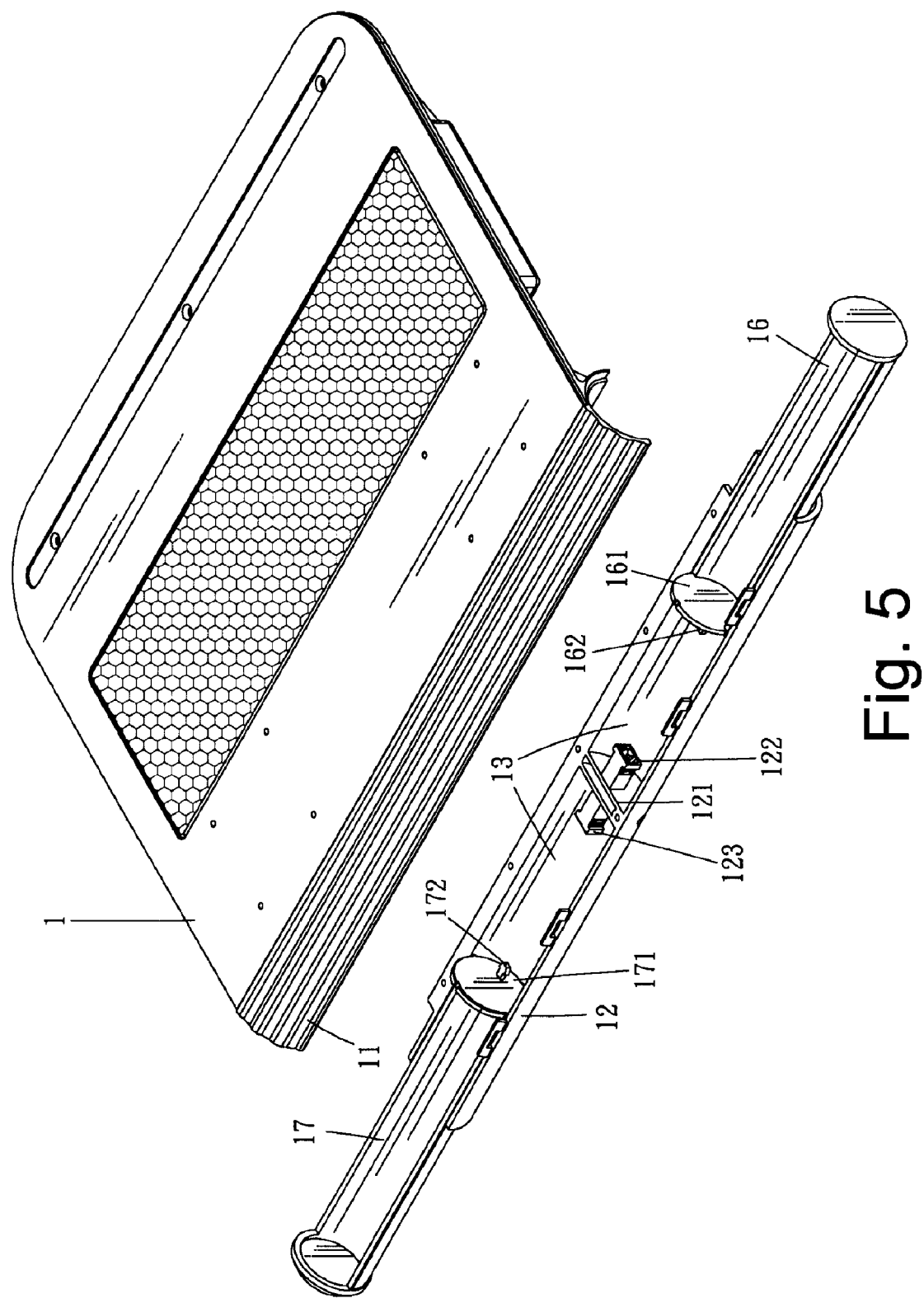
FIG. 5 is a partially exploded perspective view of a second embodiment of the present invention.
Figure 6:
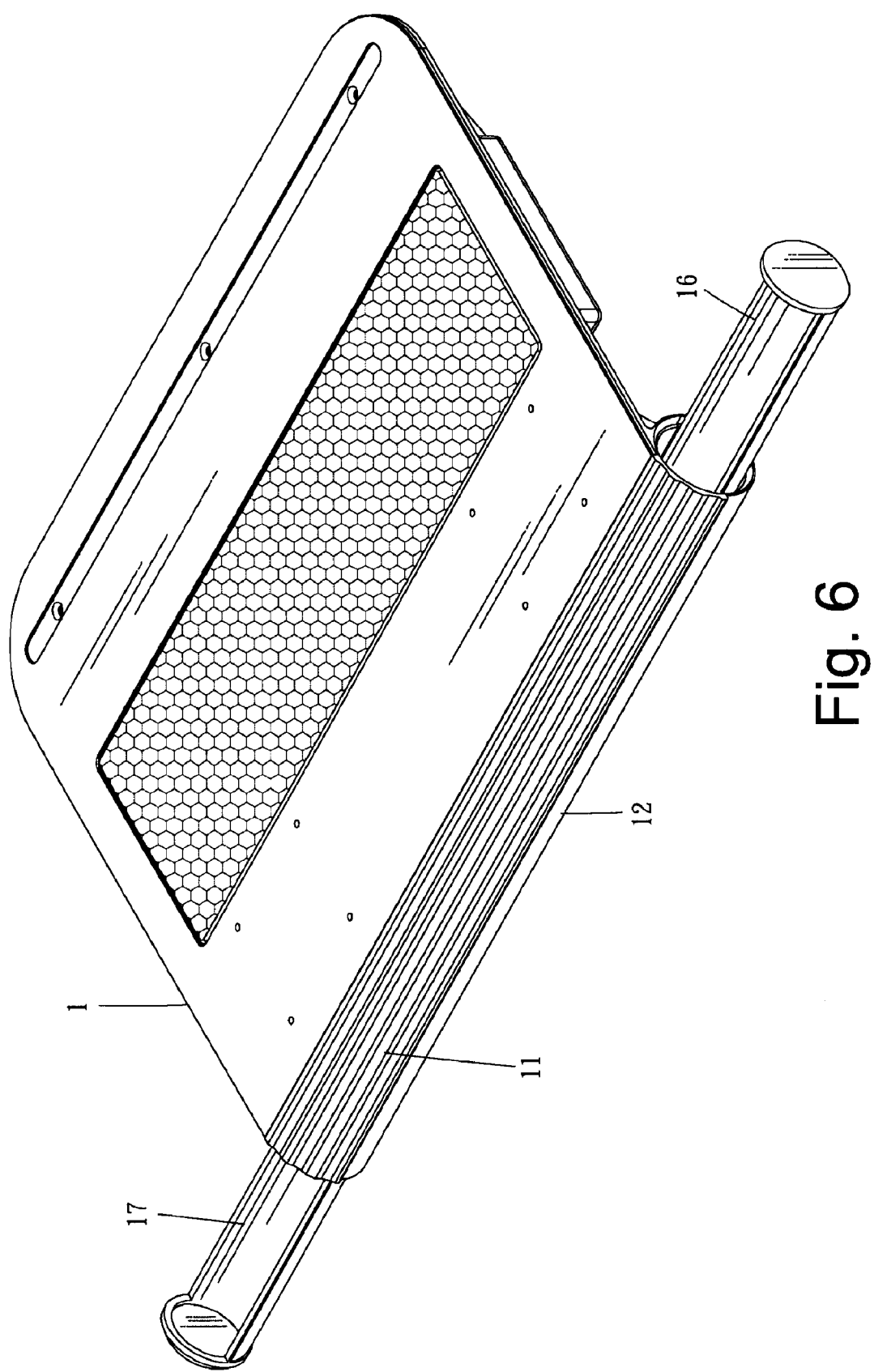
FIG. 6 is a perspective view of the second embodiment of the present invention, wherein drawers are pulled out partway.

Referring to FIGS. 5 and 6, in another embodiment of the present invention, the tubular space 13 has each of its two ends provided with a drawer 16, 17 while the cover 15 is omitted so that the drawers are bilaterally provided in the tubular space 13.

The drawers 16, 17 have inner end plates 161, 171 outwardly provided with fastening hooks 162, 172, respectively. The vertical plate 121 of the support plate 12 is formed with fastening clips 122, 123 corresponding in position to the fastening hooks 162, 172, respectively, such that, when the drawers 16, 17 are pushed into the tubular space 13, the fastening hooks 162, 172 are engaged with and retained by the fastening clips 122, 123, respectively. When the drawers 16, 17 are pushed again, the fastening hooks 162, 172 are disengaged from their corresponding fastening clips 122, 123, thereby allowing the drawers 16, 17 to be pulled out.

Figure 7:
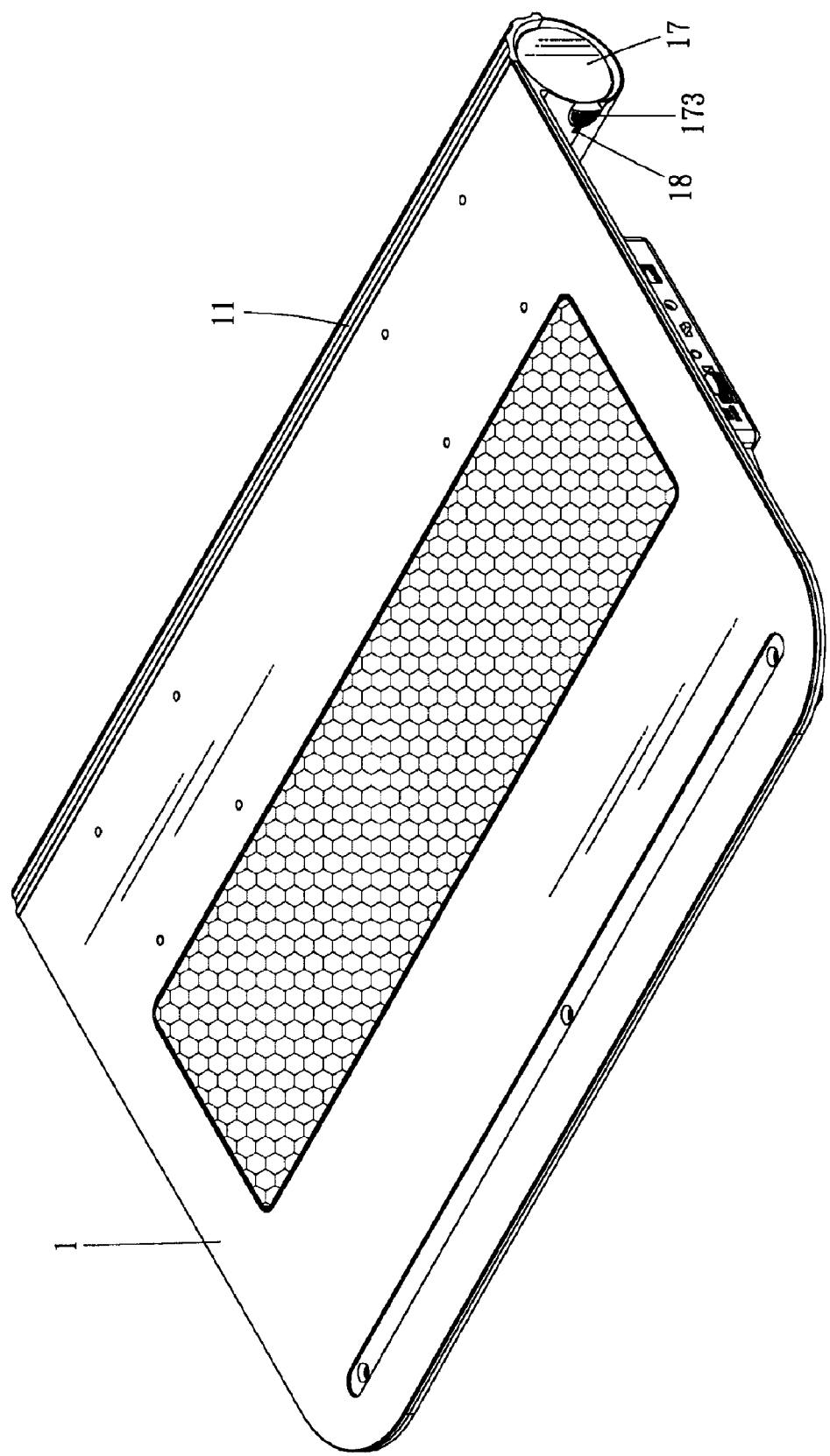
FIG. 7 is a perspective view of a third embodiment of the present invention.
Figure 8:
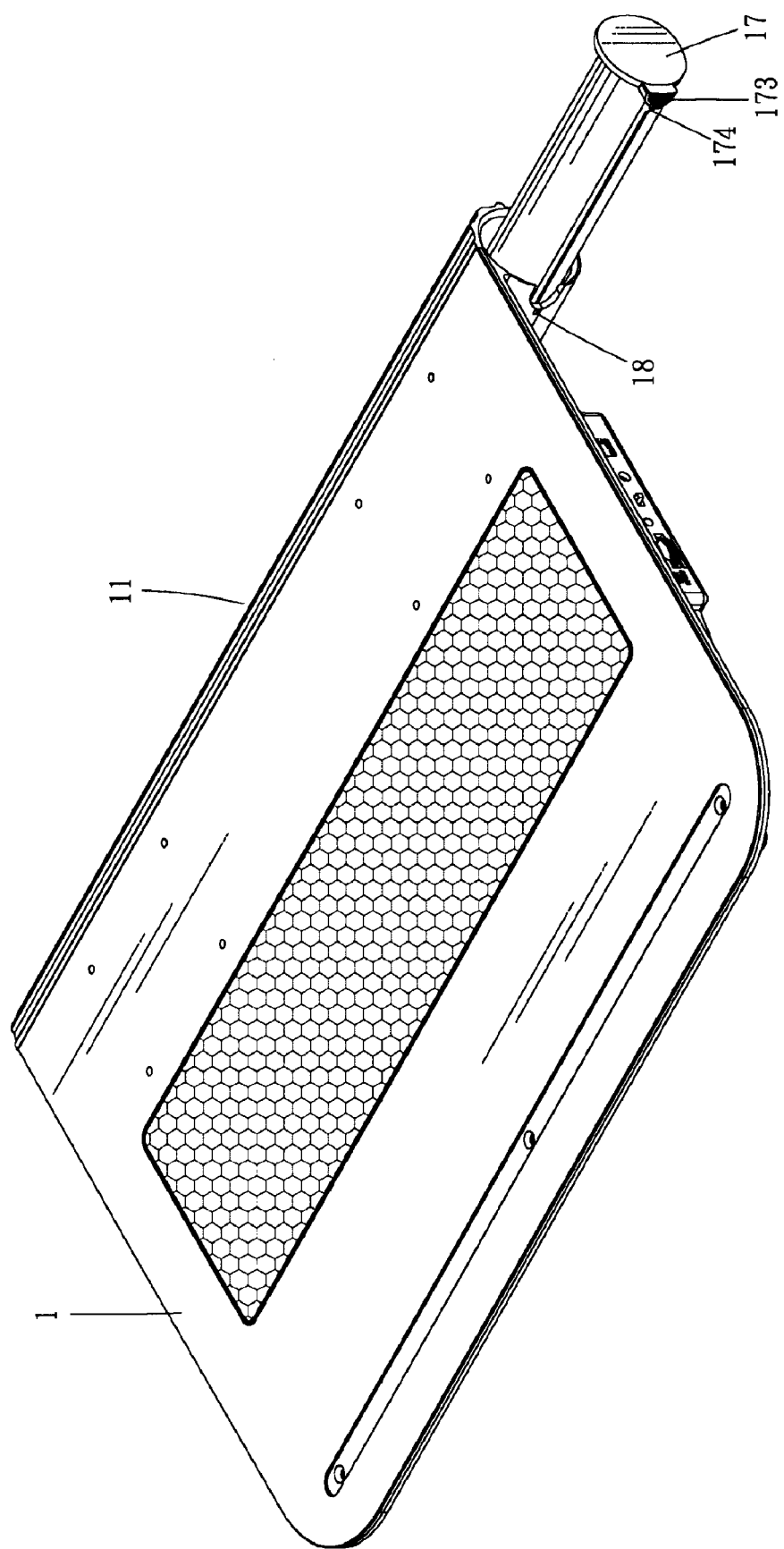
FIG. 8 is a perspective view of the third embodiment of the present invention, wherein a drawer is pulled out partway.

Referring to FIGS. 7 and 8, in yet another embodiment of the present invention, the drawers 16, 17 are secured in position and released by means of a resilient key. More particularly, a resilient element 173 is provided at a side of the drawer 16 and has a side formed with a fastening block 174. Meanwhile, the curved plate 11 is formed with a groove 18 corresponding in position to the fastening block 174, and in consequence, when the drawer 16 is pushed into the tubular space 13, the fastening block 174 is engaged in the groove 18 so as to secure the drawer 16 in place. When the resilient element 173 is pressed, the fastening block 174 is released from the groove 18 so that the drawer 16 can be pulled out.

In conclusion, the cooling pad according to the present invention is provided with the drawer at one or each of the two ends of the tubular space, thus allowing a power cable, a USB flash drive, or a stationery article to be stored in the drawer(s) conveniently.

The invention claimed is:

1. A notebook computer cooling pad with a receiving box, the notebook computer cooling pad being characterized in having a base plate whose front edge is provided with a curved plate having a bottom fixedly coupled with a support plate so that the curved plate and the support plate form a tubular space, wherein a drawer is settled in an end of the tubular space to form the receiving box that can be pulled out of or pushed into the tubular space and serves to receive a USB flash drive, a paper clip & a pen, the tubular space having an opposite end provided with a cover.

2. The notebook computer cooling pad of claim 1, wherein the drawer is provided at each of two said ends of the tubular space while the cover is omitted so that the drawers are bilaterally provided in the tubular space.

3. The notebook computer cooling pad of claim 1, wherein the drawer has an inner end plate outwardly provided with a fastening hook, and a vertical plate is provided at an appropriate position on the support plate and formed with a fastening clip corresponding in position to the fastening hook so that, when the drawer is pushed into the tubular space, the fastening hook is engaged with and retained by the fastening clip, and, when the drawer is pushed again, the fastening hook is disengaged from the fastening clip, thus allowing the drawer to be pulled out.

4. The notebook computer cooling pad of claim 1, wherein the drawer is secured in position and released by means of a resilient key implemented as a resilient element provided at a side of the drawer and having a side formed with a fastening block while the curved plate is formed with a groove corresponding in position to the fastening block so that, when the drawer is pushed into the tubular space, the fastening block is engaged in the groove, thus securing the drawer in position, and, when the resilient element is pressed, the fastening block is released from the groove, thus allowing the drawer to be pulled out.

5. The notebook computer cooling pad of claim 2, wherein the drawer has an inner end plate outwardly provided with a fastening hook, and a vertical plate is provided at an appropriate position on the support plate and formed with a fastening clip corresponding in position to the fastening hook so that, when the drawer is pushed into the tubular space, the fastening hook is engaged with and retained by the fastening clip, and, when the drawer is pushed again, the fastening hook is disengaged from the fastening clip, thus allowing the drawer to be pulled out.

6. The notebook computer cooling pad of claim 2, wherein the drawer is secured in position and released by means of a resilient key implemented as a resilient element provided at a side of the drawer and having a side formed with a fastening block while the curved plate is formed with a groove corresponding in position to the fastening block so that, when the drawer is pushed into the tubular space, the fastening block is engaged in the groove, thus securing the drawer in position, and, when the resilient element is pressed, the fastening block is released from the groove, thus allowing the drawer to be pulled out.

\* \* \* \* \*